United States Patent [19]

Lewin

[11] 4,133,237
[45] Jan. 9, 1979

[54] WORK TABLE FOR SAWS AND OTHER TOOLS

[76] Inventor: George Lewin, 21 Norman St., McKinnon, 3204, Victoria, Australia

[21] Appl. No.: 843,650

[22] Filed: Oct. 19, 1977

[51] Int. Cl.² .............................................. B27B 5/18
[52] U.S. Cl. .................. 83/467 R; 83/471.3; 83/477.2; 83/574
[58] Field of Search ................... 83/467, 471.2, 471.3, 83/477.1, 477.2, 574; 144/286 R

[56] References Cited

U.S. PATENT DOCUMENTS

| | | | |
|---|---|---|---|
| 2,803,271 | 8/1957 | Shaw | 83/574 X |
| 3,465,793 | 9/1969 | Zuk | 83/477.2 X |
| 3,734,151 | 5/1973 | Skripsky | 144/286 R X |

*Primary Examiner*—J. M. Meister
*Attorney, Agent, or Firm*—Watson, Cole, Grindle & Watson

[57] ABSTRACT

A work table for a saw includes, a base member supporting elongated guide channels at an elevated position relative to the base member, a saw mounting plate slidably supported in the guide channels, the plate having a rectangular opening over which the base plate or shoe of a commercially available portable power saw is secured, a work supporting plate capable of being removably secured in alternative positions either below the saw supporting plate in which the table operates in the docking saw mode, or above the saw supporting plate in which the table operates in the bench saw mode, the work supporting plate having stops by means of which the saw supporting plate is secured in position when the work table is operating in the bench saw mode. The work supporting plate is formed with slots for receiving the blade of the saw in both modes of operation and for receiving mitre guages and work stops. The work supporting plate is convertible to two different ranges of widths by securing the plate to the work table in different positions.

8 Claims, 7 Drawing Figures

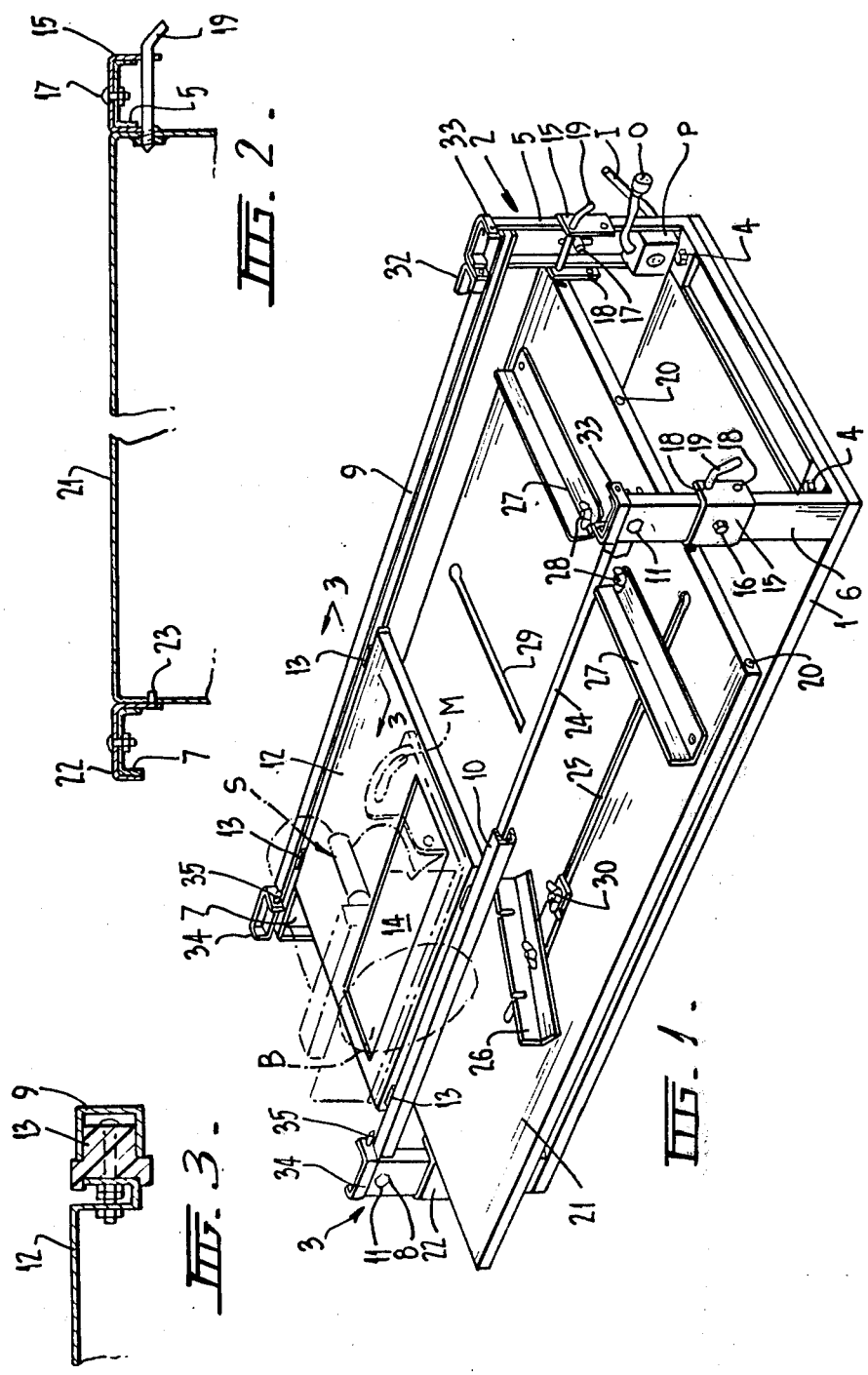

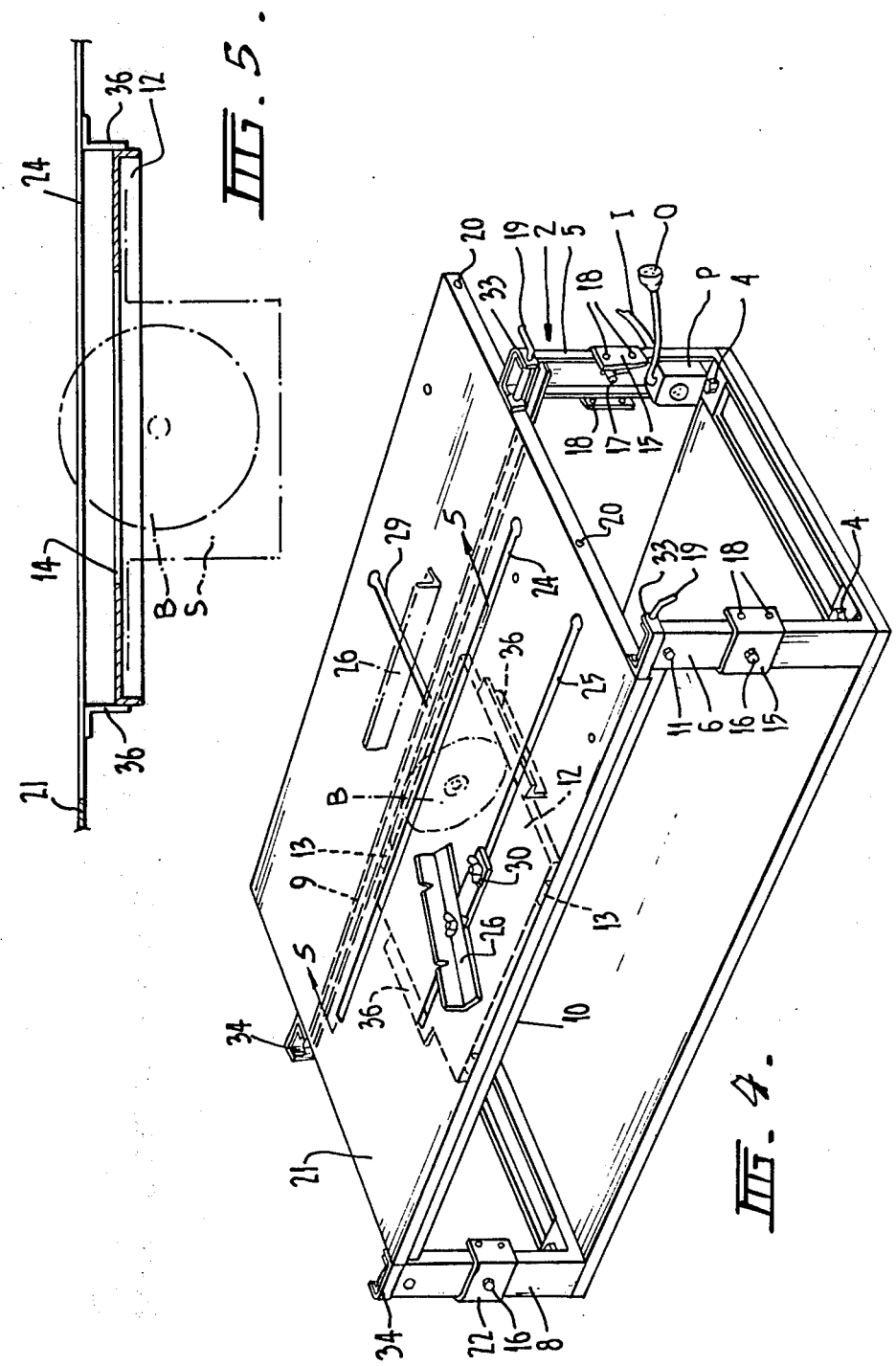

WORK TABLE FOR SAWS AND OTHER TOOLS

This invention relates to improvements in work tables for saws and other tools requiring generally horizontal guided movement. The invention is particularly applicable to work tables for guiding commercially available portable circular saws or jig saws but is nevertheless equally applicable to other tools requiring guided movement.

There are presently available many different kinds of circular saws but most of these are specially built to work either as a docking saw or as a bench saw. Attempts have been made to provide a saw that can perform both functions and an example of one such attempt is described in Australian specification No. 228,568. While the machine described therein does allow both bench saw operation and a type of docking operation, the machine is complex in construction requiring a number of precision parts and the docking operation is somewhat abnormal.

It is the object of the invention to provide an improved work table which is particularly simple in construction and use and yet allows the saw to be operated in either a bench saw mode or a docking saw mode.

In the present specification the word 'saw' should be understood to include other tools requiring generally horizontal guided movement or means for mounting same above or below a work supporting surface.

The invention provides a work table for a saw comprising a pair of spaced horizontally extending guide members secured to support members in a position that is raised from a support surface, a saw supporting plate engaged with and guided by said guide members for movement in a horizontal plane, a work supporting plate having an elongate slot which in use receives the saw blade of a saw secured to said saw supporting plate, and means on said guide support members for securing said work support plate in alternative positions below said saw supporting plate in which the work table can operate in use in a docking saw mode and above said saw supporting plate with the saw blade adapted to project upwardly through said slot in which the work table can operate in use in a bench saw mode, and means on said table for preventing movement of said saw supporting plate relative to said guide members when the table is in the bench saw mode.

The word 'horizontal' should be understood to include other planes in which it may be desired to operate the saw supporting plate.

The invention also envisages a work table kit comprising the integers defined above in disassembled form.

One preferred form of the invention will now be described with reference to the accompanying drawings in which:

FIG. 1 is a perspective view from above of the preferred work table assembled to operate in the docking saw mode;

FIG. 2 is a fragmentary sectional plan view through the far side of the table as shown in FIG. 1 showing the attachment of the work support plate thereto;

FIG. 3 is a fragmentary sectional end elevation taken along the line 3—3 in FIG. 1;

FIG. 4 is a perspective view similar to FIG. 1 showing the work table assembled to operate in the bench saw mode;

FIG. 5 is a fragmentary sectional side elevation taken along the line 5—5 in FIG. 4.

Figure 6:
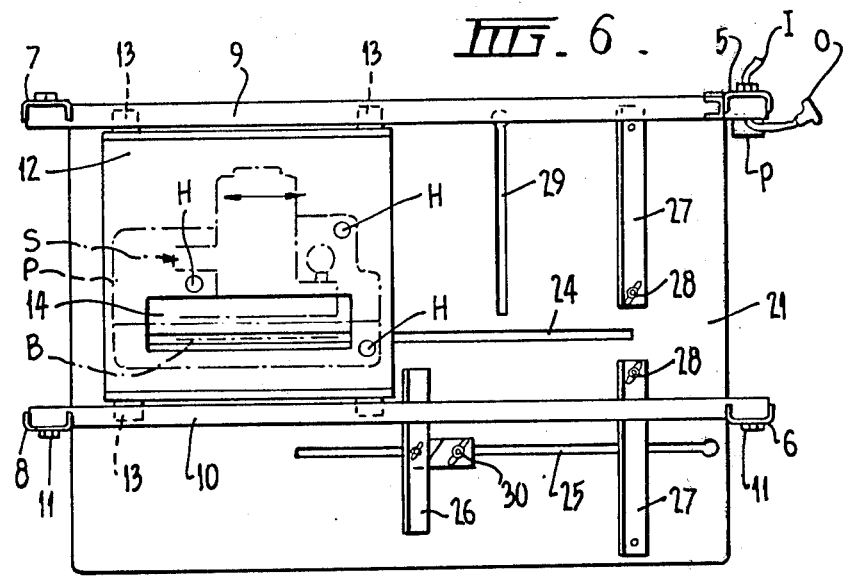
FIGS. 6 and 7 are partly schematic plan views of the table from above showing the table in its docking saw and bench saw modes respectively.

The work table shown in the drawings comprises a base member 1, which in the form shown is a sheet of particle board but may be any flat surface, fixed or portable, having two end frames 2 and 3 rigidly secured at either end thereof by bolts 4. Each end frame 2, 3 is formed from channel section steel and has two upstanding legs 5, 6 and 7, 8 respectively, with the legs 5, 7 and 6, 8 on either side of the base member 1 supporting elongate guide channels 9 and 10, located in cut outs formed in the flanges of the legs and secured thereto by bolts 11 and arranged with their open faces directed towards each other. A power switch P is located within the lower portion of leg 5 as shown and has a power inlet cord I for connection to a source of power and an outlet cord O for current to a power saw S shown in phantom outline in FIG. 1.

The guide channels 9, 10 are adapted to slidably support a saw mounting plate 12 in the manner shown in FIG. 1. As shown in FIGS. 1 and 3, the plate 12 has two plastic bearing blocks 13 adjustably secured by bolts 14 to the edges of the plate 12. The heads of the blocks 13 fit neatly in the channels 9, 10 and ensure smooth sliding action of the plate 12 relative to the channels 9, 10. The blocks 13 are adjustable inwardly and outwardly relative to the plate 12 to ensure suitably firm sliding action of the plate 12.

If desired, the channels 9 and 10 may be C-section extrusions and the blocks 13 formed with grooves receiving the inwardly directed flanges of the C-sections. This arrangement ties the channels 9, 10 together and prevents them from bowing outwardly while not adversely affecting the sliding action of the plate.

The plate 12 is formed with a rectangular opening 14 over which the base plate or shoe B of a commercially available portable circular power saw having a blade diameter of from 7¼ to 10¼ inches is secured by bolts (not shown) passing through holes H formed in suitable positions in the plate 12 so that the blade B of the saw is located adjacent and parallel to one long side of the rectangular opening 14 as shown in FIG. 6. The opening 14 has the length shown to facilitate the location of a riving knife or splitter if fitted to the saw S. The width of the opening 14 is to facilitate tipping of the saw S to perform mitre cutting in the docking mode. The saw S shown in FIG. 1 has a mitre adjustment facility at M.

The legs 5 and 6 have vertically adjustable channel brackets 15 secured thereto by bolts 16 passing through vertically slotted holes 17 in the legs 5 and 6. The brackets 15 have two vertically spaced sets of holes 18 through which locking pins 19 are adapted to pass for threaded connection with threaded holes 20 in the edges at one end of a work supporting plate 21. The pins 19 are shown fitted to one set of holes 18, the other set and the slotted holes 17 being for vertical adjustment of the plate 21 relative to the saw S. The other legs 7, 8 have brackets 22 somewhat similar to brackets 15 similarly fitted thereto. These brackets have pins 23 extending therefrom for engagement with holes in the edge of the other end of the plate 21 as shown in FIG. 2.

Figure 7:
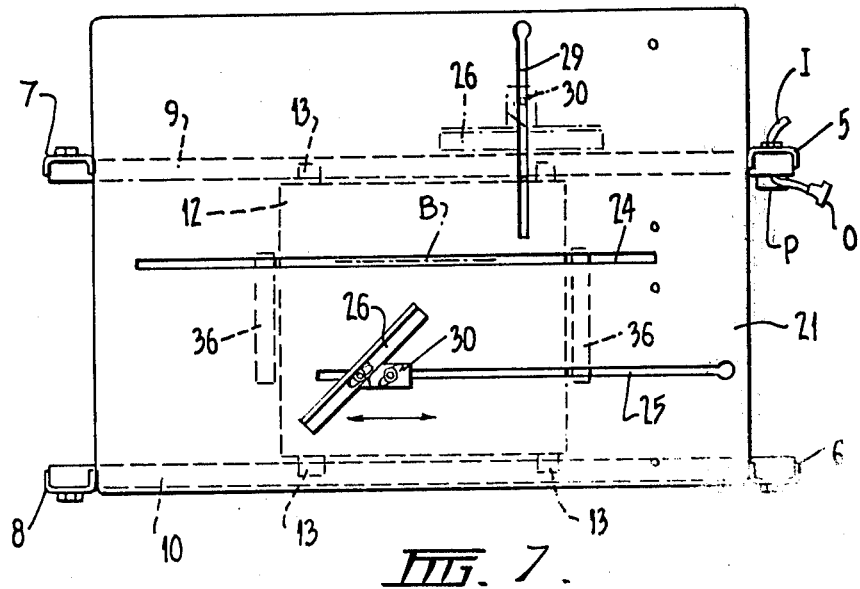

The work supporting plate 21 is formed with a centrally located elongated slot 24 which receives the blade B of the saw S in both modes of operation. The plate 21 is also formed with another longitudinal slot 25 which is capable of receiving the slider of a rip fence/mitre gauge 26 (FIG. 7). In the docking saw mode shown in FIGS. 1 and 6, a pair of work stops 27 are fixed transversely on either side of the slot 24 by quick release fasteners 28 and pins (not shown) engaging holes (FIGS. 4 and 7) in the plate 21. A still further slot 29 is formed extending transversely of the plate 21 and is also capable of receiving the slider of the rip fence/mitre gauge 26 as shown in FIGS. 1, 6 and 7. The slider of gauge 26 is capable of being clamped in any position in either of the slots 25 or 29 by a known clamping means operated by wing nut 30.

To operate the work table in the docking saw mode as shown in FIGS. 1 and 6, the plate 12 and saw S are drawn towards the operator who stands at the end of the table having the switch P so that the saw can be turned on and off conveniently. For cross cutting, the work is held firmly against the stops 27 and the saw S pulled towards the operator. For rebating the saw is simply raised the desired distance. If the timber to be cut is thicker than the depth of cut of the saw S the work supporting plate 21 is lowered to the lower set of holes 18 and pins 23 for the first cut and the timber is then turned over for the second cut. For mitre-cutting either the saw S is tilted as mentioned above or the mitre gauge 26 is fitted to slot 25 and adjusted to a suitable mitre angle somewhat as shown in FIG. 7. To prevent excessive movement of the plate 12 towards the operator, a safety stop 32 is pivotted to guide channel 9 near the leg 5 and is swung into the path of plate 12 when the table is in the docking mode.

To facilitate conversion of the table to operate in a bench saw mode (FIGS. 4 and 7) brackets 33 formed with holes to receive the pins 19 are fixed to the tops of legs 5 and 6 as shown while brackets 34 having pins 35 extending therefrom are fitted to the legs 7 and 8 also as shown. In this way the work supporting plate 21 can be removed from the position shown in FIG. 1 and laid on top of the guide channels and fixed in this position by the pins 35 engaging the holes in the rear edge of the plate 21 and the threaded pins engaging the holes 20 in the plate 21. Prior to the location of the plate 21 in this way, the saw supporting plate 12 is inverted so that the blade of the saw S secured thereto is directed upwardly. The saw mounting plate 12 is then located centrally of the table and is held in this position when the work supporting plate 21 is fixed in position as described above by locating brackets 36 (FIGS. 4, 5 and 7) secured to the underside of the plate 21 as shown.

In this mode of operation the work stops 27 are removed by releasing the couplings 28 and the mitre gauge 26 fitted in the slot 25. An overhead guard (not shown) may be mounted over the blade B to reduce saw dust spraying onto the operator. For ripping cuts, the mitre gauge 26 is fitted to slot 29 and adjusted to 0° to act as a ripping fence. If more lead-in and tail-out are required an extension (not shown) may be secured to the fence 26. For mitre-cutting or cross-cutting, the mitre gauge 26 is fitted to the slot 25 and adjusted to the desired mitre angle or 0° for cross-cutting. Grooving and rebating may be performed by adjusting the saw blade to the required height and guiding the timber by means of the mitre gauge 26 fitted to the most convenient of slots 25 or 29. Trenching can be performed by moving the gauge 26 slightly sideways after each cut.

It will be appreciated from the above description that the table is easily converted from one mode to the other and can be disassembled for storage or sale in kit form for assembly following a suitable set of instructions. Similarly, the table is adapted or can be adapted to support a jig saw, a router, a planer, grinder or sander in either of the modes described above.

It will be appreciated that the particular form of table construction described above may be modified within the spirit and scope of the invention defined in the claims. For example while the two plates 12 and 21 are most preferably formed as sheet metal pressings, they may be made from any suitable material such as wood, moulded plastics or fibreglass.

Similarly, the pins 19 may be replaced by non-threaded pins having oppositely extending press formed cheeks near one end. In this arrangement, the brackets 15 and 33 are formed with key-holes and the pins are secured in position with their ends engaging the relevant holes 20 in the plate 21 by rotating the pins when the cheeks have passed through both holes in the brackets 15 or 33. The advantage of this arrangement is that the pins and holes need not be threaded and the manual operation involved in fitting the pins to the table is made more simple.

The mitre gauge 26 may be replaced by a more sophisticated device including a plate press formed from sheet metal to have a perpendicular flange and an arcuate slot receiving a step clamping screw for adjusting the angle of the plate relative to the slider strip and for clamping the slider strip in position. The plate is pivotally secured to the slider strip by means of a bolt and wing nut or the like and a depression is formed in the plate at the 0° position of the arcuate slot to positively locate the mitre gauge in this position when required. The arcuate slot is formed so that at each extremity thereof the mitre gauge is located at 45° to the slider strip. The arrangement is preferably such that the slider strip can be reversed to increase the ripping width capacity of the table.

One of the features of the work table embodying the invention is that it is adapted for use with commercially available circular saws and allows the various cut height and angle adjustment means provided on such saws to be used while the saw is attached to the table. In this way the number of adjustments provided in the table itself is kept to a minimum thereby ensuring simplicity of construction and use.

In a modification of the bench saw operation mode not specifically illustrated in the drawings, the work supporting plate 21 is turned through 180° (relative to the position shown in FIG. 7) and is attached to the posts 5, 6, 7 and 8 by the locking pins 19 so that the plate 21 overhangs in the opposite direction to that shown in FIG. 7. The saw blade B then projects through the slot 25 and with the mitre gauge 26 located in the slot 29, the maximum rip width capacity of the table is increased from about 8½ inches (FIG. 7) to about 15 inches. The advantages of this arrangement will be obvious to persons skilled in the art.

I claim:

1. A work table for a saw comprising, a pair of spaced horizontally extending guide members secured to support members in a position that is raised from a support surface, a saw supporting plate engaged with and guided by said guide members for movement in a horizontal plane, a work supporting plate having an elongated slot which in use receives the saw blade of a saw secured to said saw supporting plate, and means on said guide support members for securing said work support plate in alternative positions below said saw supporting plate in which the work table can operate in a docking saw mode and above said saw supporting plate with the saw blade adapted to project upwardly through said slot in which the work table can operate in use in a bench saw mode, and means on said table for preventing movement of said saw supporting plate relative to said guide members when the table is in the bench saw mode.

2. The work table of claim 1, wherein said guide members are channels arranged with their open sides facing each other, at least portions of the longitudinal edges of said saw supporting plate being engaged in said channels for sliding movement relative thereto.

3. The work table of claim 2, wherein said longitudinal edges have bearing blocks secured thereto for engagement with said channels, said blocks being adjustable laterally to increase or decrease the sliding force required to move said saw supporting plate along said channels.

4. The work table of claim 2, wherein said work supporting plate has at least one work stop removably secured thereto on one side of said slot and extending perpendicularly thereto.

5. The work table of claim 4, wherein there are two work stops, one on either side of said slot.

6. The work table of claim 4, wherein said work supporting plate is formed with a slot running parallel to said first mentioned slot and a further slot extending perpendicularly to said first mentioned slot on the other side thereof to said parallel slot, said slots being adapted to receive a slider on a mitre gauge, said slider being capable of being clamped in any position in either slot by means of clamping means.

7. The work table of claim 6 wherein said parallel running slot is adapted to receive said saw blade in the bench saw mode by securing said work supporting plate in a position which is rotated through 180° to the said bench saw mode position, whereby the table has a greater rip width capacity.

8. The work table of claim 3, wherein said channels are C-section channels and said bearing blocks have grooves receiving the flanges of said C-section channels whereby the channels are tied together by the saw supporting plate.